(12) United States Patent
Huddleston (10) Patent No.: US 10,549,674 B2
(45) Date of Patent: Feb. 4, 2020

(54) TRAILER LATCH FOR BOAT MOTOR SUPPORT

(71) Applicant: Fishing Holdings, LLC, Flippin, AR (US)

(72) Inventor: Rick Huddleston, Yellville, AR (US)

(73) Assignee: WHITE RIVER MARINE GROUP, LLC, Springfield, MN (US)

( * ) Notice: Subject to any disclaimer, the term of this patent is extended or adjusted under 35 U.S.C. 154(b) by 155 days.

(21) Appl. No.: 15/094,964

(22) Filed: Apr. 8, 2016

(65) Prior Publication Data

US 2016/0297346 A1  Oct. 13, 2016

Related U.S. Application Data

(60) Provisional application No. 62/146,016, filed on Apr. 10, 2015.

(51) Int. Cl.
  *B60P 3/10* (2006.01)
  *B62D 63/08* (2006.01)

(52) U.S. Cl.
  CPC .......... *B60P 3/1066* (2013.01); *B60P 3/10* (2013.01); *B60P 3/1033* (2013.01); *B62D 63/08* (2013.01)

(58) Field of Classification Search
  CPC ........ B63H 20/36; B63H 20/008; B63H 5/20; B60P 3/1066; B60P 3/1033; B60P 3/10; F16M 13/00; B62D 63/08
  USPC ....... 410/121–124, 149–151; 440/53, 55, 63, 440/113; 248/351, 354.3, 354.5, 354.6, 248/640–643; 280/414.1; 114/55.52
  See application file for complete search history.

(56) References Cited

U.S. PATENT DOCUMENTS

| | | | |
|---|---|---|---|
| 1,987,943 A | 1/1935 | Munson | |
| 3,173,644 A * | 3/1965 | Burfiend | E21D 11/02 298/17 B |
| 3,941,344 A | 3/1976 | Paterson | |
| 4,650,427 A * | 3/1987 | Huchinson | B63H 20/36 440/55 |
| 4,842,239 A | 6/1989 | Kinsey et al. | |
| 5,021,016 A | 6/1991 | Currey | |
| 5,775,669 A | 7/1998 | Huggins et al. | |
| 6,447,350 B2 | 9/2002 | Thompson et al. | |
| 7,556,545 B2 | 7/2009 | Draghici | |
| 9,145,194 B2 | 9/2015 | Marks et al. | |

(Continued)

OTHER PUBLICATIONS

International Preliminary Report on Patentability PCT/US2016/026826 dated Oct. 10, 2017.

(Continued)

*Primary Examiner* — Stephen T Gordon
(74) *Attorney, Agent, or Firm* — Pillsbury Winthrop Shaw Pittman LLP (57) ABSTRACT

A system for supporting a motor of a boat with respect to a boat trailer is provided. The system includes a longitudinally extendable support shaft that is configured to be secured in a selected one of a plurality of extended positions, a motor support disposed at a first end of the support shaft; and a boat trailer connector disposed at a second end of the support shaft. The trailer connector includes a releasable latch to connect the trailer connector to the boat trailer. The trailer connector includes a manually enagageable actuator configured to selectively latch or release the trailer connector from the boat trailer.

10 Claims, 10 Drawing Sheets

(56) References Cited

U.S. PATENT DOCUMENTS

2001/0044243 A1 11/2001 Thompson et al.
2008/0029683 A1 2/2008 Draghici

OTHER PUBLICATIONS

International Search Report dated Sep. 16, 2016 in corresponding International Patent Application No. PCT/US2016/026826 (4 pages).
Office Action dated Feb. 6, 2019 in related U.S. Appl. No. 15/907,814, 13 pages.
Final Office Action issued on Jun. 3, 2019 in related U.S. Appl. No. 15/907,814 , 8 pages.

* cited by examiner

TRAILER LATCH FOR BOAT MOTOR SUPPORT

CROSS-REFERENCE TO RELATED APPLICATIONS

This application claims priority to U.S. Provisional Application No. 62/146,016, filed Apr. 10, 2015, which is hereby incorporated by reference in its entirety.

FIELD

The present patent application relates to a system for supporting a motor of a boat with respect to a boat trailer.

BACKGROUND

When transporting a boat on a trailer, a motor of the boat is supported in a fixed position to limit the amount of vibrational stress a bouncing motor can put on the transom of the boat. Some boats may include built-in mechanisms to support the motors while others do not. However, even the built-in support mechanisms on some boats still are prone to disengaging when rough road surfaces are encountered.

In some instances, a separate motor support mechanism may be used to support the motor in a fixed, elevated fashion, as a standalone motor support. However, just like some built-in support mechanisms, some separate support mechanisms are prone to being jarred loose, leading to possible damage to the motor, boat trailer, or motor support mechanism itself. Further, attaching a separate support mechanism can be a cumbersome process, causing some users to forego use of a separate support mechanism entirely. Therefore, improvements in the design of, and the method of attaching, a motor support mechanism are needed.

SUMMARY

One embodiment of the present patent application provides a system for supporting a motor of a boat with respect a boat trailer. The system includes a support member having a first end portion constructed and arranged to support the motor of the boat and a second end portion constructed and arranged to be releasably secured to a portion of the boat trailer; a generally inverted U-shaped member constructed and arranged to receive the portion of the boat trailer within the generally U-shaped configuration. The U-shaped member has a bight portion and a pair of leg members extending downwardly from the sides of the bight portion. The support member is constructed and arranged to be connected to one of the pair of leg members of the U-shaped member. The system also includes a releasable latch assembly constructed and arranged to releasably secure the inverted U-shaped member to the portion of the boat trailer. The latch assembly includes a latch member moveable between a latched position and a released position. In the latched position, the latch member is constructed and arranged to retain the portion of the boat trailer within the generally U-shaped configuration of the U-shaped member.

Another embodiment of the present patent application provides a system for supporting a motor of a boat with respect a boat trailer. The system includes a first support member constructed and arranged to support the motor of the boat, and a second support member constructed and arranged to be releasably secured to a portion of the boat trailer. The first support member is constructed and arranged to be received by and extending in and out of the second support member to facilitate longitudinal telescopic movement between first and second support members. The system includes a lock assembly constructed and arranged to selectively lock the first and second support members at one of a plurality of longitudinally extended positions. The lock assembly includes a lock member that is movable between a first position and a second position. The lock member is linked to lock components associated with the first and second support members so that the movement of the lock member from the first position to the second position unlocks the lock assembly to enable the longitudinal telescopic movement between first and second support members.

Yet another embodiment of the present patent application provides a system for supporting a motor of a boat with respect to a boat trailer. The system comprises a longitudinally extendable support shaft that is configured to be secured in a selected one of a plurality of extended positions; a motor support disposed at a first end of the support shaft; and a trailer connector disposed at a second end of the support shaft. The trailer connector comprises a releasable latch to connect the trailer connector to the boat trailer. The trailer connector comprises a manually engageable actuator configured to selectively latch or release the trailer connector from the boat trailer.

The present disclosure relates generally to motor support for a boat trailer. In one embodiment, and by non-limiting example, the motor support includes a latching mechanism.

In one embodiment of the present disclosure, a motor support for a boat trailer is disclosed. The motor support includes a support shaft configured to support, in a spaced-apart relationship, a motor of a boat with respect to the boat trailer. The motor support also includes a trailer end and a motor end. The trailer end defines a spring-loaded latching mechanism configured for latching the trailer end of the motor support with respect to a portion of the boat trailer.

In another embodiment of the present disclosure a motor support for a boat trailer is disclosed. The motor support includes a support shaft configured to support, in a spaced-apart relationship, a motor of a boat with respect to the boat trailer. The motor support also includes a trailer end. The trailer end defines a spring-loaded latching mechanism configured for latching the trailer end of the motor support with respect to a portion of the boat trailer. The latching mechanism defines a pull handle operable against a bias of the spring for releasing the trailer end of the motor support from the boat trailer. The motor support also includes a motor end. The motor end includes a motor support structure configured to rest against a portion of a motor of a boat.

In another embodiment of the present disclosure, a method of attaching a motor support to a boat trailer is disclosed. The method includes opening a spring-loaded latching mechanism. The method also includes coupling the latching mechanism to the boat trailer and allowing the latching mechanism to close under a spring bias.

In yet another embodiment of the present disclosure, a method of attaching a motor support to a boat trailer is disclosed. The method includes opening a spring-loaded latching mechanism that is at a first end of a motor support. The method also includes positioning the spring-loaded latching mechanism around a keel roller of a boat trailer. The method also includes coupling the latching mechanism to the keel roller of the boat trailer by allowing the latching mechanism to close under a spring bias. The method also includes supporting a motor of the boat by positioning a motor support structure against the motor. The motor support structure is at a second end of the motor support.

According to another embodiment of the present disclosure, a motor support for a boat trailer is disclosed. The motor support includes a support shaft configured to support, in a spaced-apart relationship, a motor of a boat with respect to the boat trailer. The motor support also includes a trailer end and a motor end. The trailer end defines a latching mechanism configured for latching the trailer end of the motor support with respect to a portion of the boat trailer. The latching mechanism includes an engagement portion and a retention portion. The retention portion is movable with respect to the engagement portion.

These and other aspects of the present patent application, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. In one embodiment of the present patent application, the structural components illustrated herein are drawn to scale. It is to be expressly understood, however, that the drawings are for the purpose of illustration and description only and are not intended as a definition of the limits of the present patent application. It shall also be appreciated that the features of one embodiment disclosed herein can be used in other embodiments disclosed herein. As used in the specification and in the claims, the singular form of "a", "an", and "the" include plural referents unless the context clearly dictates otherwise. As used herein, the term "may" as used in connection with any structural or functional attributes, will in some embodiments have those attributes, but that such structural or functional attributes are not required in all embodiments.

DETAILED DESCRIPTION OF THE DRAWINGS

Various embodiments will be described in detail, by way of example only, with reference to the accompanying schematic drawings, wherein corresponding reference symbols indicate corresponding parts and like reference numerals represent like parts and assemblies throughout the several views. Reference to various embodiments does not limit the scope of the claims attached hereto. Additionally, any examples set forth in this specification are not intended to be limiting and merely set forth some of the many possible embodiments for the appended claims.

Figure 1:
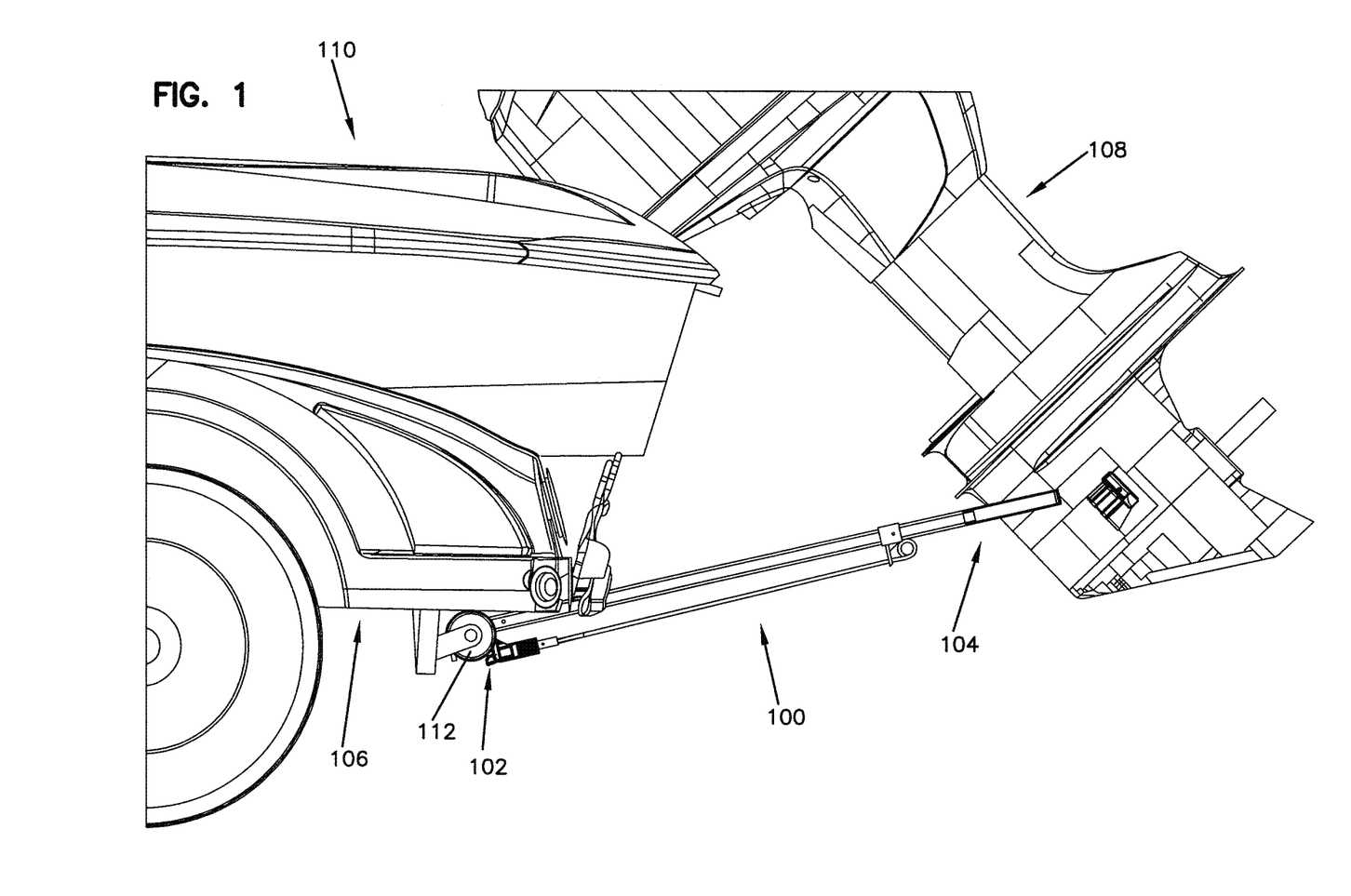
FIG. 1 illustrates a schematic side view of a motor support disposed between a boat trailer and a boat motor, according to one embodiment of the present disclosure.

FIG. 1 depicts a motor support 100 in accordance with one embodiment of the present patent application. The motor support 100 includes a trailer end 102 and a motor end 104. In one embodiment, the motor support 100 is positioned between a boat trailer 106 and a motor 108 of a boat 110. The motor support 100 is configured to hold the motor 108 of the boat 110 in a fixed, elevated position so that the lowest point of the motor 108 (i.e., the propeller (not shown)) is elevated from the ground. The trailer end 102 is in contact with the boat trailer 106, and the motor end 104 is in contact with the motor 108. In one embodiment, the trailer end 102 is latched to the boat trailer 106, for example, to a keel roller 112 of the boat trailer 106.

Figure 2:
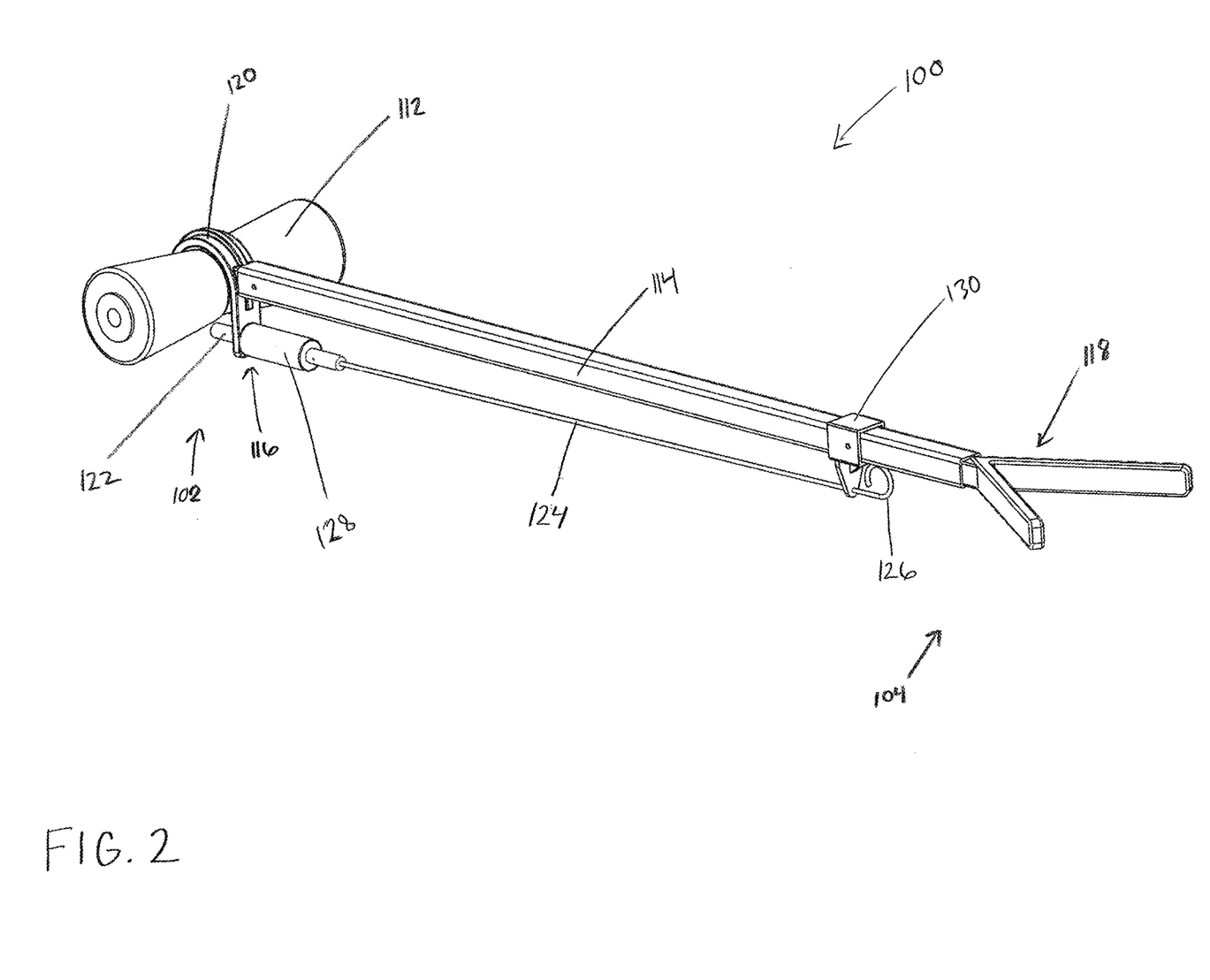
FIG. 2 illustrates a perspective view of the motor support shown in FIG. 1.

FIG. 2 shows a perspective isometric view of the motor support 100. The motor support 100 includes a support shaft 114, a latching mechanism 116, and a motor support surface 118. As shown, the motor support 100 is constructed and arranged to be attached to the keel roller 112. In one embodiment, the keel roller 112 may be a part of the boat trailer 106 shown in FIG. 1.

The support shaft 114 is disposed between the trailer end 102 and the motor end 104. In one embodiment, the support shaft 114 may generally be hollow. In another embodiment, the support shaft 114 may generally be solid. Further, in other embodiments, the support shaft 114 may be configured to be length-adjustable.

The latching mechanism 116 is configured to secure the motor support 100 to a portion of the boat 110 (as shown in FIG. 1). In one embodiment, the latching mechanism 116 is configured to be attached to the keel roller 112 of the boat trailer 106.

The latching mechanism 116 includes an engagement portion or element 120 and a retention portion or element 122.

The engagement element 120 is configured to engage a portion of the boat trailer 106 so as to removably secure the motor support 100 to the boat trailer 106. In one embodiment, the engagement element 120 is an arm. In one embodiment, the engagement element 120 may be generally curved (i.e., hooked), and is configured to partially surround an upper portion of the keel roller 112. The engagement element 120 is configured to latch onto the keel roller 112 of the boat trailer 106 to prevent the motor support 100 from disengaging in the horizontal direction.

The retention element 122 is configured to retain the engagement element 120 on the boat trailer 106, for example, to the keel roller 112 of the boat trailer 106. The retention element 122 has two positions: a closed position and an open position. In the closed position, the retention element 122 aids in maintaining the latching of the latching mechanism 116 to the boat trailer 106, for example, to the keel roller 112 of the boat trailer 106 and limits removal of the latching mechanism 116 from the keel roller 112 of the boat trailer 106. In the open position, the retention element 122 allows for removal of the latching mechanism 116 from the keel roller 112 of the boat trailer 106. In one embodiment, the retention element 122 is a pin.

In one embodiment, the retention element 122, shown as a pin, is movable between the closed position and the open position by way of an attached rod 124 with a pull handle 126. To move the retention element 122 to the open position, the user of the motor support 100 pulls the pull handle 126 of the rod 124 in a direction toward the motor end 104. To move the retention element 122 to the closed position, the rod 124 is moved in a direction toward the trailer end 102. As shown, the rod 124 and the retention element 122 are generally parallel to the support shaft 114. In one embodiment, the rod 124 may be placed at least partially, or completely, within the support shaft 114. The rod 124 is partially contained within a latching cylinder 128 at the trailer end 102 of the motor support 100 and is supported at the motor end 104 of the motor support 100 by way of a rod hanger 130. In one embodiment, the latching cylinder 128 also houses an internal spring that is configured to spring load the rod 124 and the latching mechanism 116 (described in detail in FIGS. 3 and 4).

The rod 124 is configured to be a length that is similar to the length of the support shaft 114. The pull handle 126 of the rod 124 is positioned near the motor end 104 to ensure ease of access by the user during operation of the motor support 100.

Figure 3:
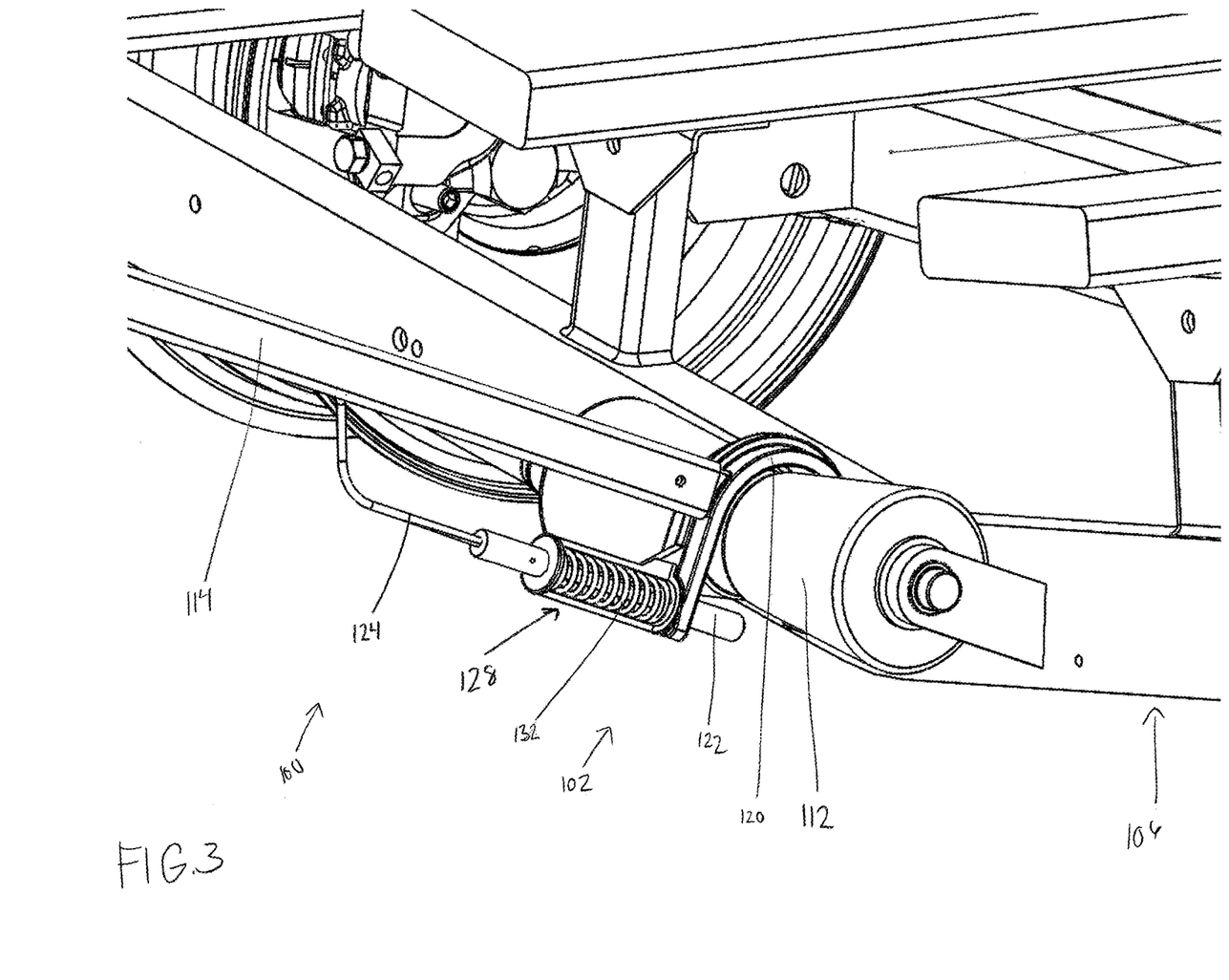
FIG. 3 illustrates a schematic side view of a portion of a motor support similar to that of FIG. 1, shown in a closed position, portions of the motor support are cut-way to show the internal features thereof.

FIG. 3 shows a side perspective view of a portion of a motor support 100' attached to the keel roller 112 of the boat trailer 106. In one embodiment, the rod 124 is partially housed within the support shaft 114. The retention element 122 is shown in the closed position, and a partial cutaway view of the latching cylinder 128 is shown.

In one embodiment, the latching cylinder 128 encases a spring 132. The rod 124 enters at one side of the latching cylinder 128 and is attached to the retention element 122 at the opposite side of the latching cylinder 128. Within the latching cylinder 128, the spring 132 is coiled around the rod 124 and biased against the latching cylinder 128 at one end and against the retention element 122 at the other end. In its resting state, and when the rod 124 is not operated by a user, the spring 132 keeps the retention element 122 in the closed position.

Figure 4:
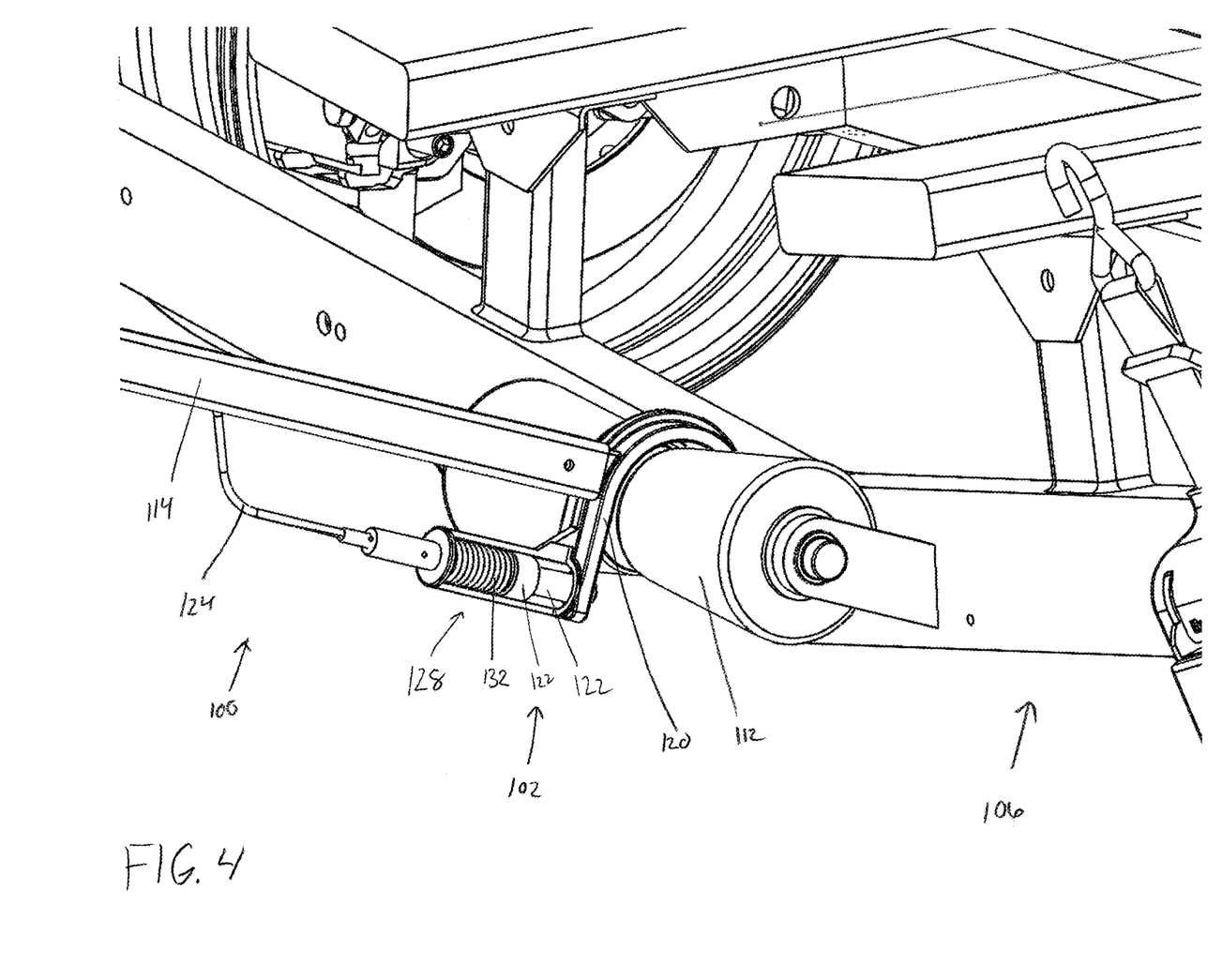
FIG. 4 illustrates a schematic side view of a portion of the motor support of FIG. 3, shown in an open position.

FIG. 4 shows the retention element 122 in the open position. Accordingly, the rod 124 is shown in a retracted state, and the spring 132 is shown in a compressed state. In one embodiment, the spring force of the spring 132 may be a value that can be overcome by a human hand pull and strong enough to force the retention element 122 back to the closed position when the rod 124 is released by the user.

Figure 5:
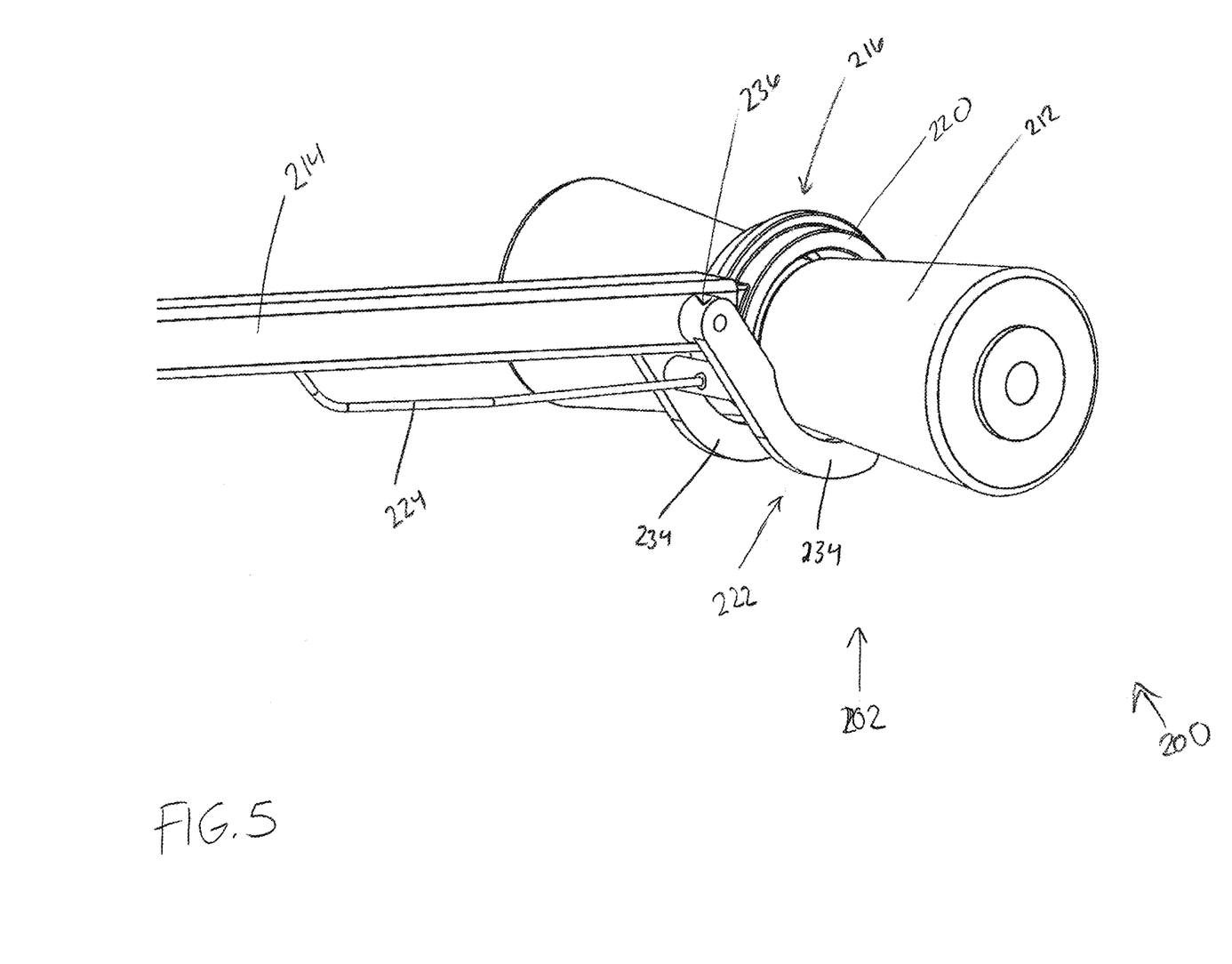
FIG. 5 illustrates a perspective view of a motor support, according to another embodiment of the present disclosure.

FIG. 5 shows a portion of a motor support 200 according to another embodiment of the present disclosure. The motor support 200 includes a trailer end 202, a latching mechanism 216, a support shaft 214, and a pull rod 224. The motor support 200 shares similar elements with the motor support 100 and 100' as described above.

The latching mechanism 216 of the motor support 200 includes an engagement element 220 and a retention element 222. In one embodiment, the engagement element 220 includes a first arm 220. In one embodiment, the first arm 220 is a curved arm that is configured to partially surround the upper portion of a keel roller 212.

Also, in one embodiment, the retention element 222 includes a second arm 222. In one embodiment, the second arm 222 is a curved arm that is configured to partially surround the lower portion of the keel roller 212. Additionally, the second arm 222 is pivotable with respect to the first arm 220. In one embodiment, the second arm 222 is pivotally connected to the support shaft 214. Also, in one embodiment, the second arm 222 may include multiple fingers 234. For example, in one embodiment, the second arm 222 includes two fingers 234. In one embodiment, the number of fingers may vary. The fingers 234 are configured to wrap partially around the keel roller 212 of the boat trailer 106.

The second arm 222 is connected to the rod 224 and is configured to pivot about the first arm 220 between a closed position and an open position when the rod 224 is pulled by a user. In the closed position, the first arm 220 and the second arm 222 are configured to secure the motor support 200 to the boat trailer 106, specifically the keel roller 212 of the boat trailer 106. When the second arm 222 is in the open position, the motor support 200 can be easily removed from the boat trailer 106, for example, from the keel roller 212 of the boat trailer 106.

In one embodiment, the latching mechanism 216 can be spring loaded similar to the embodiments 100 and 100'. In one embodiment, the second arm 222 of the latching mechanism 216 may include a torsion spring at the pivot attachment point 236 configured to keep the second arm 222 in the closed position in a resting state. In another embodiment, the second arm 222 may be biased against the first arm 220 by way of a linear coil spring.

To attach the motor support 100 (100') or 200 shown in FIGS. 1-5 to the boat trailer 106, the user of the motor support 100, 200 first opens the latching mechanism 116, 216. After opening the latching mechanism 116, 216, the user then couples the latching mechanism 116, 216 to a portion of the boat trailer 106. In one embodiment, when the user couples the latching mechanism to the boat trailer 106, the user allows the latching mechanism 116, 216 to close under a spring bias. In one embodiment, the user positions the latching mechanism 116, 216 around the keel roller 112 of the boat trailer. It is contemplated that other portions of the boat trailer 106 may be used for attaching the motor support 100. After coupling the latching mechanism 116 to the boat trailer 106, the user then supports the boat motor 108 (shown in FIG. 1) by positioning the motor support structure 118 against the boat motor 108.

Even though a number of embodiments of the motor support 100 have been described as including spring-loaded latching mechanisms, other types of latching mechanisms may be used. For example, in one embodiment, the retention element 122, 222 may be movable between the closed position and the open position by way of an electrical signal (e.g., an electric switch). The electrical signal can be transferred from a switch at the motor end 104, to a series of wires, and then to an electrical controller. In such an embodiment, the controller may be configured to control the retention element 122, 222. In one embodiment, the retention element 122, 222 may be movable by way of an electrical solenoid. Manual levers or similar mechanical mechanisms may also be used to control the retention element 122, 222.

In one embodiment, a method of attaching a motor support to a boat trailer further comprising pulling a rod to open the spring-loaded latching mechanism. In one embodiment, the method further comprising hooking the latching mechanism on the keel roller and allowing the latching mechanism to close under a spring bias. In one embodiment, the spring-loaded latching mechanism defines a latching arm and a latching pin, wherein the latching pin is operable against a bias of the spring. In one embodiment, the latching mechanism defines a first latch arm and a second latch arm, wherein the second latch arm is pivotable with respect to the first latch arm against a bias of the spring.

In one embodiment, the present patent application provides a motor support for a boat trailer. In one embodiment, the motor support comprises a support shaft configured to support, in a spaced-apart relationship, a motor of a boat with respect to the boat trailer; and a trailer end and a motor end, wherein the trailer end defines a latching mechanism configured for latching the trailer end of the motor support with respect to a portion of the boat trailer, the latching mechanism having an engagement portion and a retention portion, the retention portion being movable with respect to the engagement portion. In one embodiment, the engagement portion is a latching arm and the retention portion is a latching pin.

FIGS. 6-10 provide a system 1000 for supporting the motor 108 (as shown in FIG. 1) of the boat 110 (as shown in FIG. 1) with respect the boat trailer 106 (as shown in FIG. 1) in accordance with another embodiment of the present patent application. The configuration of the system 1000 is same as that of the system 100 described with respect to FIGS. 1-5, except for some difference as noted below.

Figure 6:
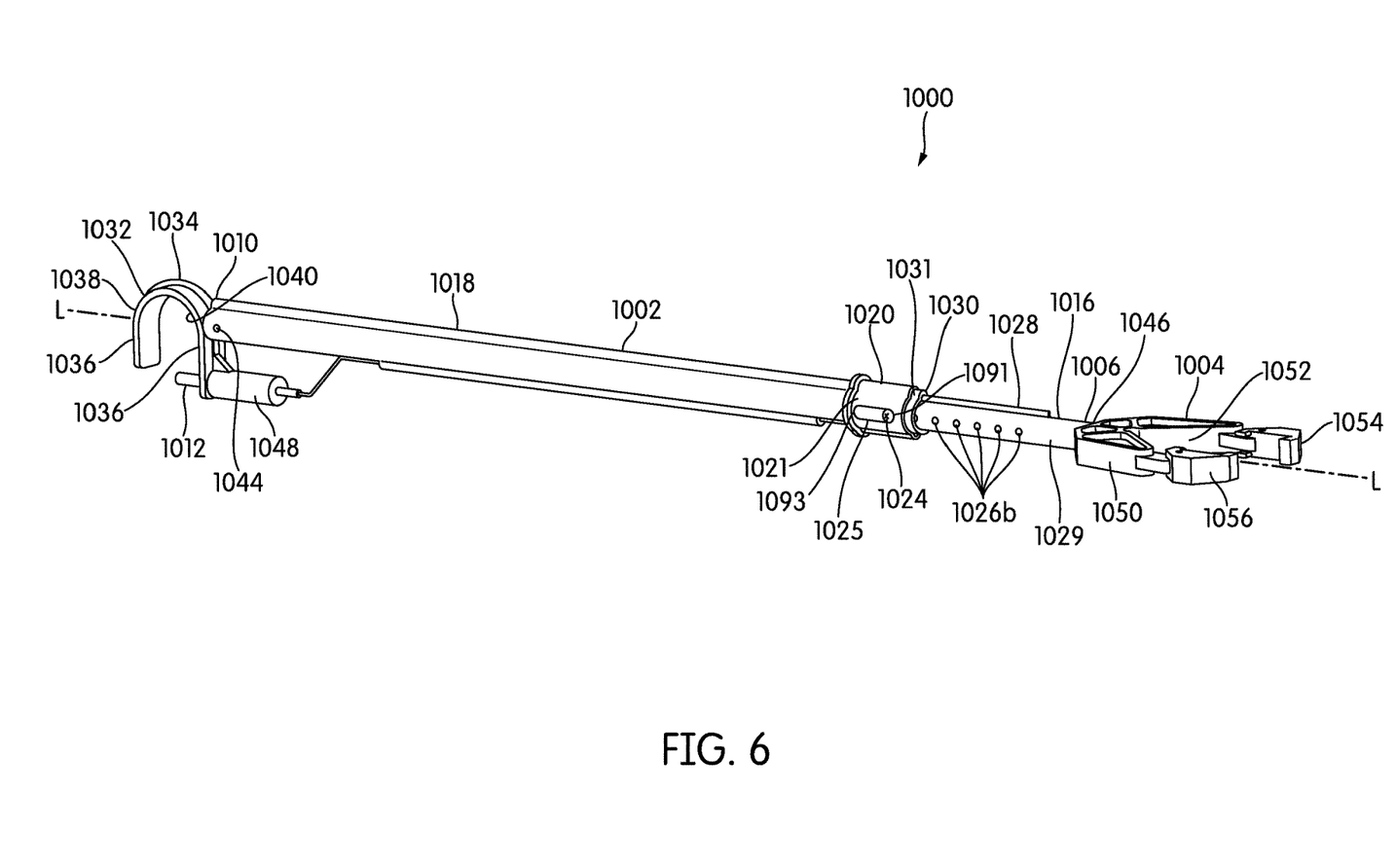
FIG. 6 shows a perspective view of a system for supporting a motor of a boat with respect a boat trailer in accordance with another embodiment of the present patent application.

In one embodiment, the system 1000 includes a longitudinally extendable support shaft or member 1002 that is configured to be secured in a selected one of a plurality of extended positions. In one embodiment, the system 1000 includes a motor support 1004 disposed at a first end 1006 of the support shaft 1002 and a trailer connector 1032 disposed at a second end 1010 of the support shaft 1002. In one embodiment, the trailer connector 1032 includes a releasable latch 1012 to connect the trailer connector 1032 to the boat trailer 106. The trailer connector 1032 includes a manually enagageable actuator 1021 that is configured to selectively latch or release the trailer connector 1032 from the boat trailer 106.

In one embodiment, the motor support 1004 includes a support member 1050 having a generally V-shaped engagement portion 1052 (as clearly seen in FIG. 8) that is constructed and arranged to frictionally engage a portion of the motor 108 of the boat 110. In one embodiment, the motor support 1004 also includes a pair of adjustable support members 1054, 1056 extending from end portions of the support member 1050. In one embodiment, the pair of adjustable support members 1054, 1056 are constructed and arranged to frictionally engage portions of the motor 108 of the boat 110. In one embodiment, each of the adjustable support members 1054, 1056 and the corresponding end portions of the support member 1050 have openings that are configured to align on a same axis and to receive a lock member or pin (not shown) therein to lock each of the adjustable support members 1054, 1056 with their corresponding end portions of the support member 1050. In one embodiment, the pair of adjustable support members 1054, 1056 are constructed and arranged to be pivotably adjustable with respect to their corresponding end portions of the support member 1050 and to support the portions of the motor 108 of the boat 110.

In one embodiment, the motor support 1004 may be made of an appropriate metal (such as aluminum or steel) or other material of suitable strength. In one embodiment the motor support 1004 may be made of molded plastic material. In one embodiment, the motor support 1004 may be made of any other suitable material or combination of materials having sufficient durability to support the motor 108 of the boat 110 while maintaining structural stability of the system 1000. In one embodiment, mechanical damping material (e.g., such as foam) may be attached to portions of the motor support 1004.

In one embodiment, the motor support 1004 includes a connector portion 1046 extending outwardly therefrom. In one embodiment, the connector portion 1046 is constructed and arranged to be received by the end 1006 of the support shaft 1002. In one embodiment, the end 1006 of the support shaft 1002 has an opening to receive the connector portion 1046 therein. In one embodiment, the connector portion 1046 of the motor support 1004 and the end 1006 of the support shaft 1002 each have corresponding openings that are configured to align on a same axis and to receive a lock member or pin (not shown) therein to lock the motor support 1004 with the support shaft 1002. In one embodiment, the lock pin is a releasable lock pin configured to releasably lock the motor support 1004 with the support shaft 1002. In one embodiment, the releasable locking arrangement between the motor support 1004 and the support shaft 1002 allows the user to use the same support shaft with different sized motor supports and/or with motor supports having different configurations. In one embodiment, the releasable locking arrangement between the motor support 1004 and the support shaft 1002 allows the user to replace just the motor support 1004 when it is worn out or damaged. In another embodiment, the motor support 1004 may be integrally formed with a first support member 1016 of the shaft member 1002. For example, in one embodiment, the motor support 1004 may be integrally formed at the end 1006 of the first support member 1016 of the shaft member 1002.

In one embodiment, the longitudinally extendable support shaft 1002 of the system 1000 includes the first support member 1016 that is constructed and arranged to support the motor 108 of the boat 110 and a second support member 1018 that is constructed and arranged to be releasably secured to a portion (e.g., keel roller 112 as shown in FIG. 1) of the boat trailer 106.

In one embodiment, the first and second support members 1016 and 1018 may be made of an appropriate metal (such as aluminum or steel) or other material of suitable strength. In one embodiment, the first and second support members 1016 and 1018 may be made of molded plastic material. In one embodiment, the first and second support members 1016 and 1018 may be made of any other suitable material or combination of materials having sufficient durability to support the motor 108 of the boat 110 (as shown in FIG. 1) with respect the boat trailer 106 while maintaining structural stability of the system 1000. In one embodiment, the first and second support members 1016 and 1018 may be made by an extrusion procedure.

In one embodiment, the first support member 1016 may be also referred to as the motor end support member. In one embodiment, the first support member 1016 includes the end 1006 and an opposing end (not shown). In one embodiment, the first support member 1016 is constructed and arranged to support the motor 108 of the boat 110 at the end 1006.

In one embodiment, the first support member 1016 is generally hollow and has a generally circular cross-sectional configuration. In another embodiment, the first support member 1016 is generally solid and has a generally circular cross-sectional configuration. In yet another embodiment, the first support member 1016 may have other cross-sectional configurations.

In one embodiment, the first support member 1016 may include a stop member 1028 generally extending along (the longitudinal axis L-L of the support member 1002) a portion or the entire length of the first support member 1016 and generally extending outwardly from an outer or external surface 1029 of the first support member 1016. In one embodiment, the stop member 1028 is in the form of a protrusion. In one embodiment, the stop member 1028 is constructed and arranged to be received by a stop member receiving portion 1030 of the second support member 1018 so as to prevent any relative rotation between the first support member 1016 and the second support member 1018.

In the illustrative embodiment, one stop member is shown. In one embodiment, the number of stop members may vary. For example, such stop members may be positioned circumferentially around the first support member 1016.

In one embodiment, the first support member 1016 includes a plurality of lock components or lock engaging structures 1026b to lock the first support member 1016 with the second support member 1018. In one embodiment, the lock engaging structures 1026b are in the form of holes, grooves, openings or notches to engage with a lock member 1024 of a lock assembly 1020 as will be described in detail below.

In one embodiment, the lock components or lock engaging structures 1026b are positioned on about one half of the length of the first support member 1016 that is closer to the end 1006. In one embodiment, the lock components or lock engaging structures 1026b are positioned on about one third of the length of the first support member 1016 that is closer to the end 1006. In one embodiment, the lock components or lock engaging structures 1026b are positioned on about one fourth of the length of the first support member 1016 that is closer to the end 1006. In one embodiment, the lock components or lock engaging structures 1026b are positioned on about two thirds of the length of the first support member 1016 that is closer to the end 1006.

In one embodiment, the second support member 1018 may be referred to as the boat trailer end support member. In one embodiment, the second support member 1018 includes the end 1010 and an opposing end (not shown). In one embodiment, the second support member 1018 is constructed and arranged to be releasably secured to a portion (e.g., keel roller 112 as shown in FIG. 1) of the boat trailer 106 at the end 1010.

Figure 10:
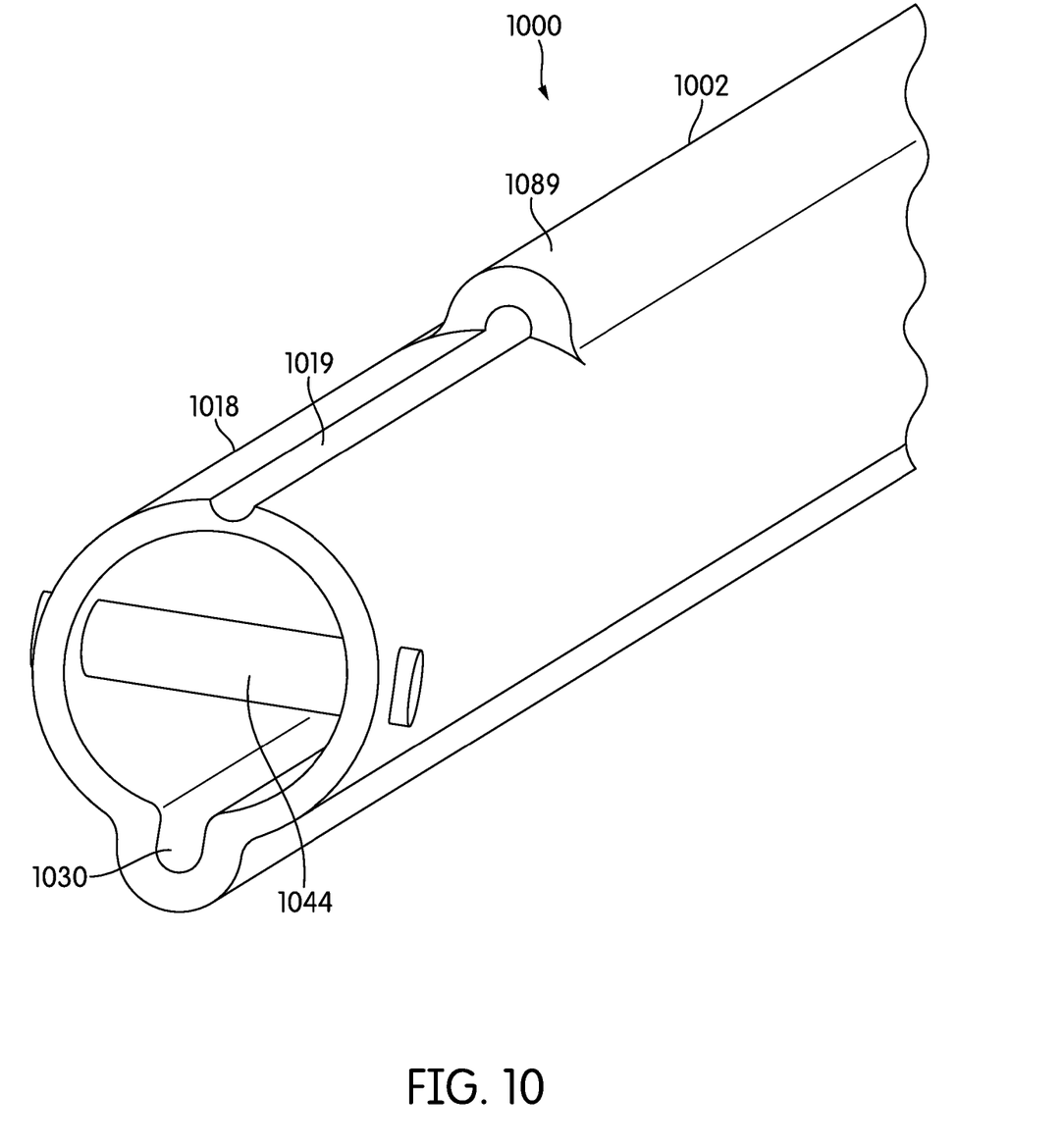
FIG. 10 shows a partial perspective view of a second support member of the system in accordance with an embodiment of the present patent application.

In one embodiment, the second support member 1018 is generally hollow and has a generally circular cross-sectional configuration. In another embodiment, the second support member 1018 may have other cross-sectional configurations. In one embodiment, the second support member 1018 includes the stop member receiving portion 1030 generally extending along (the longitudinal axis L-L of the support member 1002) a portion or the entire length of the second support member 1018. In one embodiment, the stop member receiving portion 1030 is in the form of a groove. In one embodiment, the stop member receiving portion 1030 is an inwardly facing groove extending outwardly from the second support member 1018.

In one embodiment, the stop member receiving portion 1030 is constructed and arranged to receive the stop member 1028 of the first support member 1016 therein so as to prevent any relative rotation between the first support member 1016 and the second support member 1018. In the illustrative embodiment, one stop member receiving portion 1030 is shown. In another embodiment, the number of stop member receiving portions may vary. For example, such stop members may be positioned circumferentially around the second support member 1018 and configured to receive their corresponding stop members.

In another embodiment, the stop member receiving portion may be positioned on the first support member 1016 and is configured to receive the corresponding stop member positioned on the second support member 1018 so as to prevent any relative rotation between the first support member 1016 and the second support member 1018. It is contemplated that the stop member receiving portion and the corresponding stop member may have other shapes, sizes and configurations as would be appreciated by one skilled in the art as long as they to prevent any relative rotation between the first support member 1016 and the second support member 1018.

In one embodiment, the second support member 1018 includes a lock component or lock engaging structure 1026a that is constructed and arranged to align with one of the lock engaging structures 1026b of the first support member 1016 to accommodate and to allow the lock member 1024 of the lock assembly 1020 to be inserted into one of the lock engaging structures 1026b of the first support member 1016, when the first support member 1016 is in the predetermined or desired longitudinally extended position with the second support member 1018.

In one embodiment, the first support member 1016 is constructed and arranged to be received by and extending in and out of the second support member 1018 to facilitate longitudinal telescopic movement between the first and second support members 1016 and 1018.

In one embodiment, the system 1000 includes the lock assembly 1020 that is constructed and arranged to selectively lock the first and second support members 1016 and 1018 at one of a plurality of longitudinally extended positions. That is, in one embodiment, the lock assembly 1020 is configured to lock the first support member 1016 and the second support member 1018 at a predetermined or desired longitudinally extended position. In one embodiment, the lock assembly 1020 includes the lock member 1024 that is movable between a first position and a second position. The lock member 1024 is linked to the lock components 1026 (e.g., 1026a, 1026b) associated with the first and second support members 1016 and 1018 so that the movement of the lock member 1024 from the first position to the second position unlocks the lock assembly 1020 to enable the longitudinal telescopic movement between first and second support members 1016 and 1018.

In one embodiment, the first support member 1016 is configured to be moved and adjusted longitudinally along the longitudinal axis L-L of the support member 1002 and with respect to the second support member 1018 in the plurality of longitudinally extended positions as desired by the user.

In one embodiment, the lock assembly 1020 includes a bias member. In one embodiment, the bias member is a spring. In one embodiment, the bias member of the lock assembly 1020 is constructed and arranged to be positioned between a manually engageable member 1021 (its structure and operation are described in detail below) and an outer or exterior surface 1031 of the second support member 1018. In one embodiment, the lock member 1024 is held inserted in one of the plurality of lock engaging structures 1026b of the first support member 1016 by the bias member. Thus, the bias member is constructed and arranged to lock the lock assembly 1020 at a selected position and to prevent relative movement of the first and second support members 1016 and 1018.

The operation of the lock assembly 1020 as described below. In one embodiment, the lock member 1024 is pulled against the force of the bias member, thus, the lock member 1024 is moved outwardly away from the lock engaging structure 1026b of the first support member 1016 unlocking the lock assembly 1020. Once the lock member 1024 is withdrawn from the lock engaging structure 1026b of the first support member 1016, the first and second support members 1016 and 1018 are extended slightly so that the lock engaging structure 1026b of the first support member 1016 no longer aligns with the lock engaging structure 1026a of the second support member 1018, the force of bias member will cause the lock member 1024 to engage with the outer or exterior surface 1031 of the second support member 1018 and slide along this surface until the lock member 1024 becomes aligned with another or second lock engaging structure 1026b of the first support member 1016. At this point, the bias of the bias member forces the lock member 1024 into the second lock engaging structure 1026b of the first support member 1016 to lock the lock member 1024 at this selected longitudinally extended position.

In another embodiment, the lock assembly 1020 may be in the form of an adjustment knob. For example, in one embodiment, the adjustment knob is turned to loosen the knob. The adjustment knob is then pulled to release its lock member 1024 from one of the plurality of lock engaging structures 1026b of the first support member 1016. In one embodiment, the first support member 1016 and the second support member 1018 are then slid until the support shaft 1002 is at the user desired length. The adjustment knob is then released such that its lock member 1024 engages with the other of the plurality of lock engaging structures 1026 of the first support member 1016. After adjusting the support shaft 1002 to the desired position and locking the support shaft or member 1002 at the desired length (by engaging its lock member 1024 with one of the plurality of lock engaging structures 1026b of the first support member 1016), the adjustment knob is tightened by the user.

In one embodiment, the system 1000 may include a stop to guide the lock member 1024 to be inserted into one of the lock engaging structures 1026b of the first support member 1016 and to prevent the lock member 1024 from traveling past the lock engaging structures 1026b of the first support member 1016. In another embodiment, the stop is optional.

In one embodiment, the system 1000 includes generally inverted U-shaped member 1032. In one embodiment, the inverted U-shaped member 1032 may also be referred to as the trailer connector. In one embodiment, the inverted U-shaped member 1032 is constructed and arranged to receive the portion 112 of the boat trailer 106 within the generally U-shaped configuration. In one embodiment, the inverted U-shaped member 1032 is positioned on the end 1010 of the support shaft 1002 or the second support shaft 1018.

In one embodiment, the U-shaped member 1032 has a bight portion 1034 and a pair of leg members 1036 extending downwardly from the sides 1038 and 1040 of the bight portion 1032. In one embodiment, the leg members 1038, 1040 are generally perpendicular to the longitudinal axis L-L of the support member 1002. In one embodiment, the support shaft 1002 is constructed and arranged to be connected to one of the pair of leg members 1038, 1040 of the U-shaped member 1032.

Figure 7:
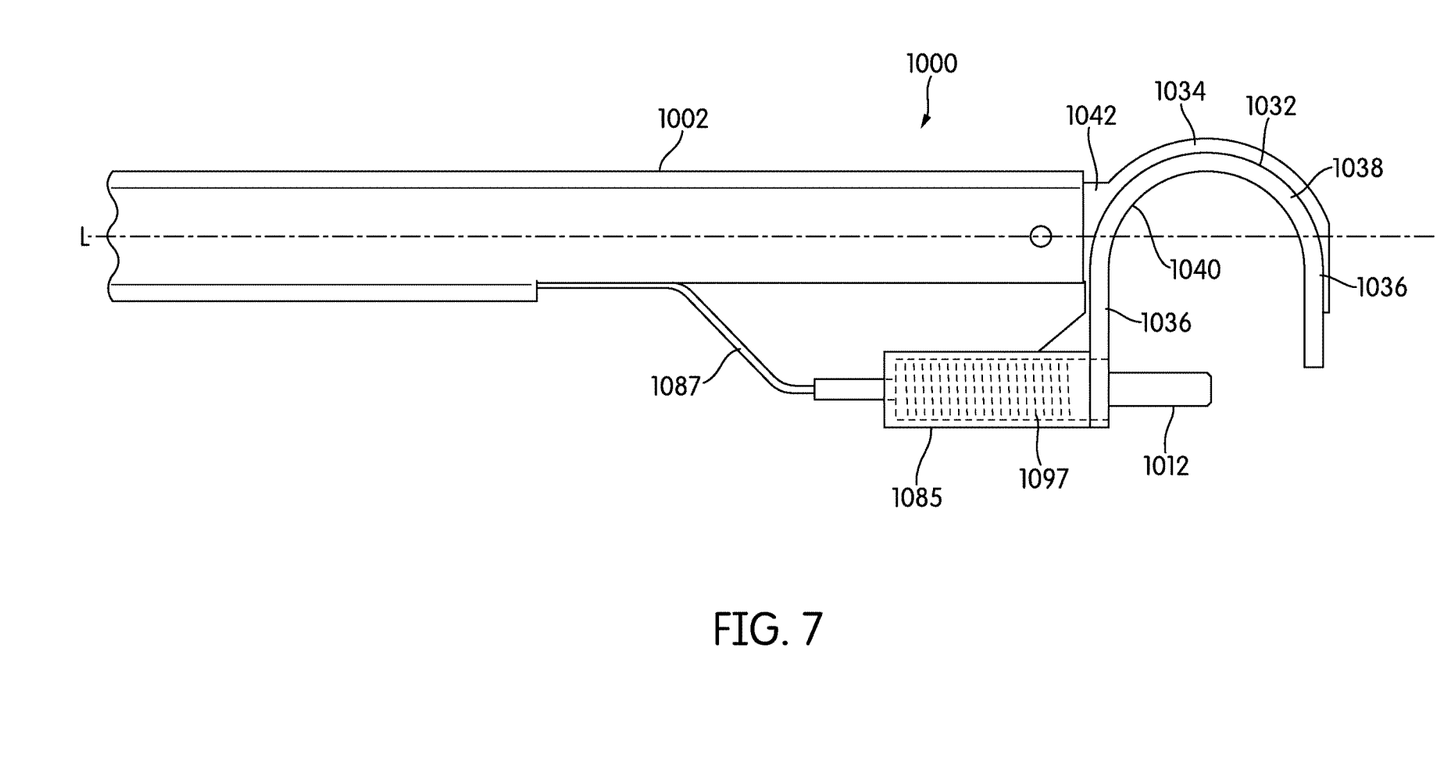
FIG. 7 shows a partial, front elevational view of the system in accordance with an embodiment of the present patent application.
Figure 8:
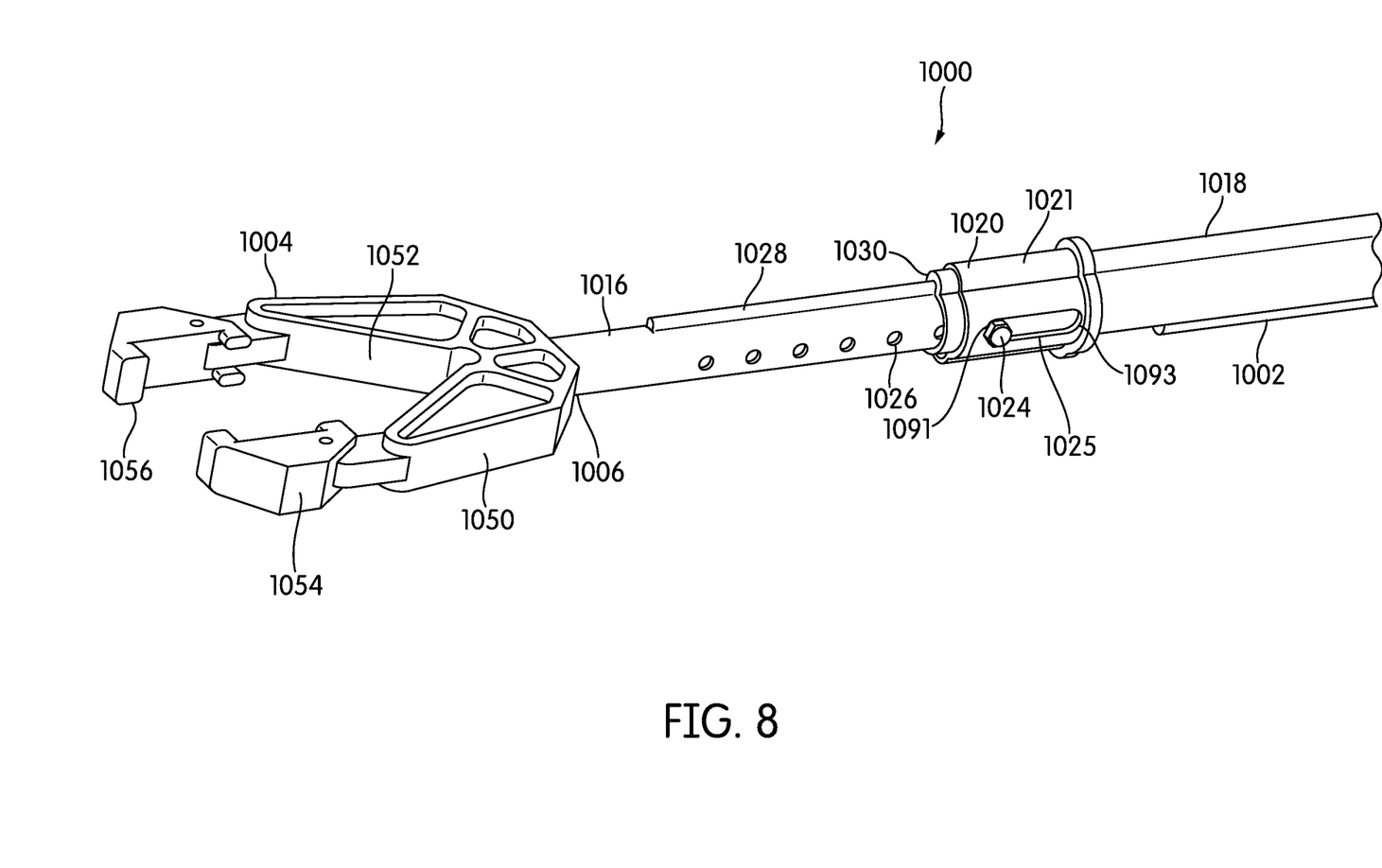
FIG. 8 shows a partial, perspective view of the system in accordance with an embodiment of the present patent application.

In one embodiment, the inverted U-shaped member 1032 includes a connector portion 1042 (as shown in FIG. 7) extending outwardly from one of the leg members 1038, 1040. In one embodiment, the connector portion 1042 is constructed and arranged to be received by the end portion 1010 of the second shaft member 1018. In one embodiment, the end portion 1010 of the second shaft member 1018 has an opening to receive the connector portion 1042 therein. In one embodiment, the connector portion 1042 of the inverted U-shaped member 1032 and the end portion 1010 of the second shaft member 1018 each have corresponding openings that are configured to align on a same axis and to receive a lock pin 1044 therein to lock the inverted U-shaped member 1032 with the second shaft member 1018. In one embodiment, the lock pin 1044 is a releasable lock pin configured to releasably lock the inverted U-shaped member 1032 with the second shaft member 1018. In one embodiment, the releasable locking arrangement between the inverted U-shaped member 1032 and the second shaft member 1018 of the support shaft 1002 allows the user to use the same support shaft with different sized inverted U-shaped members and/or inverted U-shaped members with different configurations. In one embodiment, the releasable locking arrangement between the inverted U-shaped member 1032 and the second shaft member 1018 of the support shaft 1002 allows the user to replace just the inverted U-shaped member 1032 when it is worn out or damaged. In another embodiment, the inverted U-shaped member 1032 may be integrally formed with the second support member 1018 of the shaft member 1002. In one embodiment, the inverted U-shaped member 1032 may be integrally formed at the end 1010 of the second support member 1018 of the shaft member 1002.

In one embodiment, the system 1000 includes a releasable latch assembly 1048 that is constructed and arranged to releasably secure the inverted U-shaped member 1032 to the portion 112 of the boat trailer 106. In one embodiment, the latch assembly 1048 includes the latch member 1012 moveable between a latched position and a released (or unlatched) position. In the latched position, the latch member 1012 is constructed and arranged to retain the portion 112 of the boat trailer 106 within the generally U-shaped configuration of the inverted U-shaped member 1032. That is, in one embodiment, the latch member 1012 is constructed and arranged to connect the trailer connector 1032 to the boat trailer 106. In one embodiment, the latch member 1012 is constructed and arranged to be movable in the direction of the longitudinal axis L-L of the support member 1002 between the latched position and the released position. In another embodiment, the latch member 1012 is constructed and arranged to be pivotable between the latched position and the released position. In one embodiment, the latch assembly 1048 includes a bias member 1097 (as shown in FIG. 7) constructed and arranged to bias the latch member 1012 toward the latched position. In one embodiment, the bias member 1097 is a spring.

In one embodiment, the construction, components and operation of the latch assembly 1048 is similar to the latching mechanism 116 as described in detail with respect to FIGS. 2-4 of the present patent application. For example, the latch assembly 1048 may include a release rod 1087 (e.g., similar to the rod 124 as shown in FIGS. 1-4 and rod 224 as shown in FIG. 5), the bias member 1097 (e.g., similar to the spring 132), the latch member 1012 (e.g., similar to the retention element 122 or 222), and a latch housing 1085 (e.g., similar to the latching cylinder 128 as shown in FIGS. 1-4). Differences between the latch assembly 1048 and the latching mechanism 116 are noted below.

In one embodiment, the system 1000 includes the manually engageable member 1021 that is configured to selectively latch or release the trailer connector 1032 from the boat trailer 106. In one embodiment, the manually engageable actuator 1021 is constructed and arranged to be moved to effect movement of the latch member 1012 between the latched position and the released position.

In one embodiment, the manually engageable member 1021 is constructed and arranged to slidably positioned on the second support member 1018. In one embodiment, the manually engageable member 1021 is constructed and arranged to receive the second support member 1018 therein. In one embodiment, the manually engageable member 1021 includes a groove constructed and arranged to receive the stop member receiving portion 1030 of the second support member 1018 so as to prevent any relative rotation between the manually engageable member 1021 and the second support member 1018. In one embodiment, the manually engageable member 1021 may be made of an appropriate metal (such as aluminum or steel) or other material of suitable strength.

Figure 9:
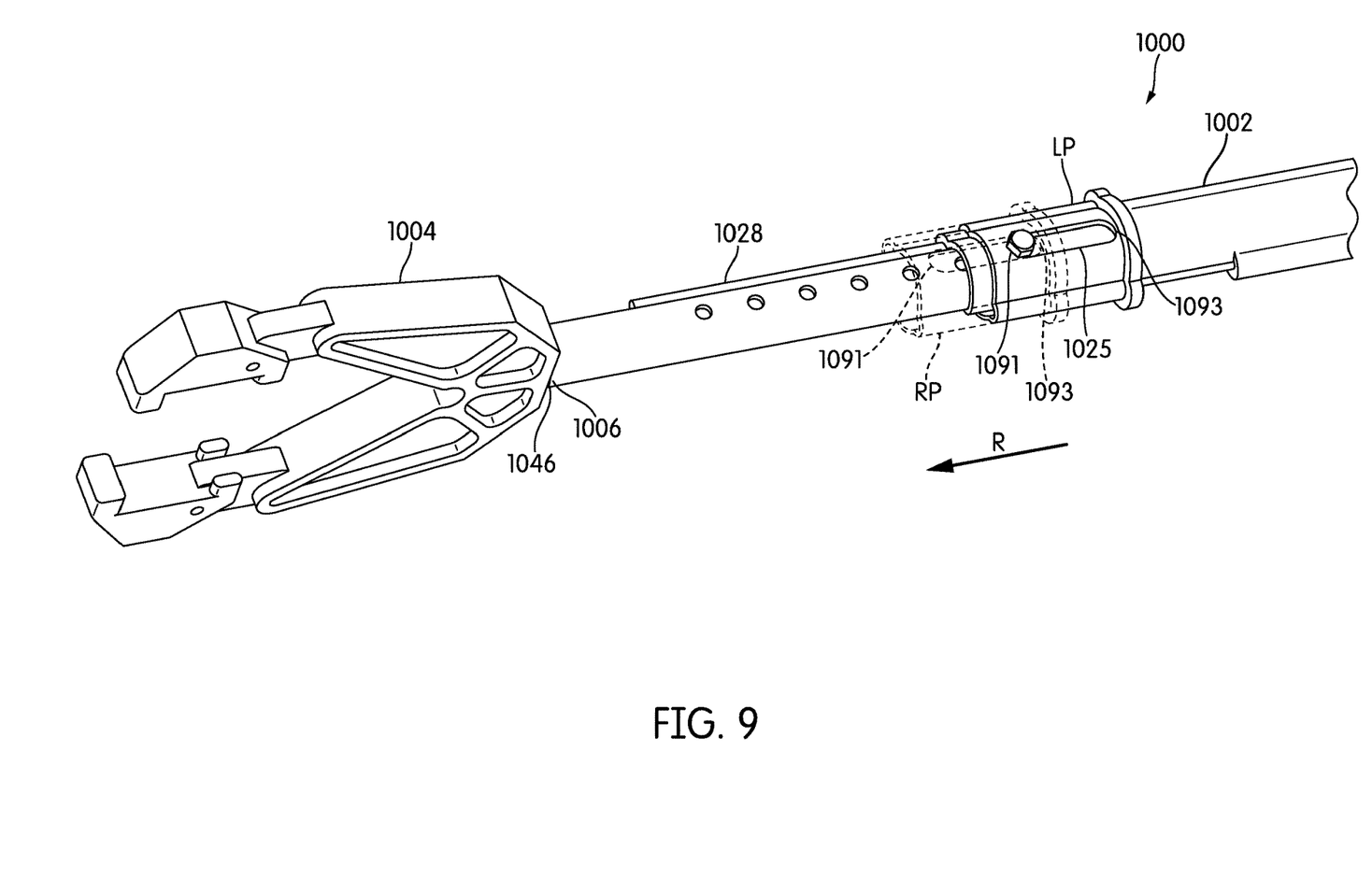
FIG. 9 shows another partial perspective view of the system in accordance with an embodiment of the present patent application.

In one embodiment, the manually engageable member 1021 includes an elongated opening 1025. In one embodiment, the elongated opening 1025 is constructed and arranged to receive the lock member 1024 of the lock assembly 1020 therein. In one embodiment, a portion of the lock member 1024 extends through the elongated opening 1025 such that the manually engageable member 1021 is able to slidably move on the second support member 1018 to selectively latch or release the trailer connector 1032 from the boat trailer 106. That is, the manually engageable member 1021 is constructed and arranged to travel over the lock member 1024 of the lock assembly 1020. In one embodiment, the elongated opening 1025 includes a first end portion 1091 and a second end portion 1093.

In one embodiment, the release rod 1087 is connected to a portion of the manually engageable member 1021 such that the slidable movement of the manually engageable member 1021 on the second support member 1018 causes the release rod 1087 to move along with the manually engageable member 1021.

The operation of the manually engageable member 1021 is described in detail below. When the first support member 1016 and the second support member 1018 are locked at a predetermined or desired longitudinally extended position by the lock assembly 1020, the lock member 1024 of the lock assembly 1020 is positioned at the first end portion 1091 of the elongated opening 1025. FIG. 9 shows the manually engageable member 1021 in its first position LP in which the lock member 1024 is at the first end portion 1091 of the elongated opening 1025.

The manually engageable member 1021 is then manually actuated by a user to move the lock member 1012 from its latched position to its release position. In one embodiment, the user may manually slide the manually engageable member 1021 on the second support member 1018 in a direction of the arrow R (as shown in FIG. 9) and towards the end 1006 of the support shaft 1002 to effect movement of the latch member 1012 from its latched position and its released position. FIG. 9 shows the manually engageable member 1021 in its second position RP in which the lock member 1024 is at the second end portion 1093 of the elongated opening 1025.

The operation and interaction of the release rod 1087, the bias member 1097, the latch member 1012 of the latch assembly 1048 are similar to those described with respect to FIGS. 1-5, and hence will not be described in detail here. For example, in one embodiment, pulling back or sliding the manually engageable member 1021 (from its first position LP to second position RP) on the second support member 1018 pulls the release rod 1087 along with it. This movement of the release rod 1087 causes the latch member 1012 (i.e., operatively connected to the release rod 1087) to be moved from its latched position to its released position as described in detail with respect to FIGS.1-5. Once the latch member 1012 is moved to its released position, the trailer connector 1034 can slide over the keel roller 112 of the boat trailer 106.

When the user releases the manually engageable member 1021, the bias member 1097 causes the release rod 1087 and the manually engageable member 1021 operatively connected to the release rod 1087 to return to their original positions. For example, the bias of the bias member 1097 causes the manually engageable member 1021 to return to its original position LP. Also, as explained in detail with respect to FIGS. 1-5, the bias of the bias member 1097 causes the release rod 1087 and the latch member 1021 operatively connected to the release rod 1087 to return to their original/latched positions.

In one embodiment, the second support member 1018 includes a notch 1019 (as shown in FIG. 10) that is constructed and arranged to receive the release rod 1087 of the latch assembly 1048 therein. In one embodiment, the notch 1019 is formed by an extrusion procedure on the outer surface 1031 of the second support member 1018. In one embodiment, the notch 1019 is an outwardly facing groove extending inwardly from the outer surface 1031 of the second support member 1018. In one embodiment, the notch 1019 generally extends along (the longitudinal axis L-L of the support member 1002) a portion or the entire length of the second support member 1018.

In one embodiment, the second support member 1018 includes a cover member 1089 that is configured to cover or contain the release rod 1087 positioned in the notch 1019. In one embodiment, the cover member 1089 may be integrally formed with the second support member 1018.

Although the present patent application has been described in detail for the purpose of illustration, it is to be understood that such detail is solely for that purpose and that the present patent application is not limited to the disclosed embodiments, but, on the contrary, is intended to cover modifications and equivalent arrangements that are within the spirit and scope of the appended claims. In addition, it is to be understood that the present patent application contemplates that, to the extent possible, one or more features of any embodiment can be combined with one or more features of any other embodiment.

What is claimed is:

1. A motor support for a boat trailer comprising:
   a support shaft configured to support, in a spaced-apart relationship, a motor of a boat with respect to the boat trailer;
   a trailer end comprising a trailer connector, the trailer connector configured to connect to a portion of the boat trailer; and
   a motor end configured to engage with the motor of the boat,
   wherein the trailer end defines a spring-loaded latch mechanism configured to releasably secure the trailer connector of the motor support with respect to the portion of the boat trailer, and
   the spring-loaded latch mechanism being movable between (a) a latch position to secure the portion of the boat trailer to the trailer connector and (b) a release position to release the trailer connector from the portion of the boat trailer so as to enable removal of the trailer connector from the portion of the boat trailer.

2. The motor support of claim 1, wherein the latch mechanism comprises a spring and defines a pull handle operable against a bias of the spring for releasing the trailer connector of the motor support from the boat trailer.

3. The motor support of claim 1, wherein the latch mechanism comprises a spring and defines a latch pin, and wherein the latch pin is operable against a bias of the spring.

4. The motor support of claim 3, wherein the support shaft has a longitudinal axis, and wherein the latch pin is movable in a direction parallel to the longitudinal axis.

5. The motor support of claim 1, wherein the trailer connector is a hook.

6. A motor support for a boat trailer comprising:
a support shaft configured to support, in a spaced-apart relationship, a motor of a boat with respect to the boat trailer;
a trailer end, wherein the trailer end comprises a trailer connector configured to connect to a portion of the boat trailer and defines a spring-loaded latch mechanism configured to releasably secure the trailer connector of the motor support with respect to the portion of the boat trailer,
wherein the latch mechanism comprises a spring and defines a pull handle operable against a bias of the spring to releasably secure the trailer connector of the motor support with respect to the portion of the boat trailer;
the spring-loaded latch mechanism being movable between (a) a latch position to secure the boat trailer to the trailer connector and (b) a release position to release the trailer connector from the portion of the boat trailer so as to enable removal of the trailer connector from the portion of the boat trailer; and
a motor end, wherein the motor end includes a motor support structure configured to rest against a portion of the motor of the boat.

7. The motor support of claim 6, wherein the portion of the boat trailer includes a keel roller of the boat trailer.

8. The motor support of claim 6, wherein the latch mechanism includes a latch pin, and wherein the latch pin is attached to the pull handle.

9. The motor support of claim 1, wherein the trailer connector is configured to be positioned around the portion of the boat trailer.

10. The motor support of claim 1, wherein the trailer connector includes a generally inverted U-shaped member constructed and arranged to receive the portion of the boat trailer within the generally U-shaped configuration, wherein the inverted U-shaped member includes a bight portion and a pair of leg members extending downwardly from the sides of the bight portion, and wherein the support shaft is constructed and arranged to be connected to one of the pair of leg members of the inverted U-shaped member.

* * * * *

UNITED STATES PATENT AND TRADEMARK OFFICE
CERTIFICATE OF CORRECTION

| | |
|---|---|
| PATENT NO. | : 10,549,674 B2 |
| APPLICATION NO. | : 15/094964 |
| DATED | : February 4, 2020 |
| INVENTOR(S) | : Rick Huddleston |

Page 1 of 1

It is certified that error appears in the above-identified patent and that said Letters Patent is hereby corrected as shown below:

On the Title Page

Item (73) Assignee:
Replace "WHITE RIVER MARINE GROUP, LLC, Springfield, MN (US)"
With -- WHITE RIVER MARINE GROUP, LLC, Springfield, MO (US) --

Signed and Sealed this
Fourteenth Day of April, 2020

Andrei Iancu
*Director of the United States Patent and Trademark Office*